United States Patent [19]

Hofstetter

[11] 4,284,407

[45] Aug. 18, 1981

[54] RELIEF SCULPTURE GUIDANCE METHOD

[76] Inventor: Ben H. Hofstetter, 1917 Texas, Norman, Okla. 73071

[21] Appl. No.: 19,319

[22] Filed: Mar. 9, 1979

[51] Int. Cl.³ .............................................. G09B 19/10
[52] U.S. Cl. ...................................................... 434/82
[58] Field of Search ...................................... 35/26, 41

[56] References Cited

U.S. PATENT DOCUMENTS

| | | | |
|---|---|---|---|
| 473,001 | 5/1892 | Blanther | 35/26 |
| 1,351,392 | 8/1920 | Manheimer | 35/26 |
| 1,447,379 | 3/1923 | Furste | 35/26 |
| 1,895,814 | 1/1933 | Nelson | 35/26 |
| 2,138,024 | 8/1935 | Cheesman | 35/41 |
| 2,242,631 | 5/1941 | Stillman | 35/26 |
| 2,392,046 | 1/1946 | Johnson | 35/26 X |
| 2,755,587 | 7/1956 | Hirst | 35/26 |
| 3,061,500 | 10/1962 | Kreier, Jr. | 35/26 |
| 3,301,725 | 1/1967 | Frontera | 35/26 |
| 3,346,411 | 10/1967 | O'Dell | 35/26 X |
| 3,457,625 | 7/1969 | Wanamaker | 35/26 |
| 3,553,062 | 10/1971 | Berlin | 35/41 |
| 3,574,017 | 4/1971 | Kass | 35/26 |
| 3,742,620 | 7/1973 | Knoll | 35/26 |
| 3,826,020 | 7/1974 | Zutz | 35/26 |

*Primary Examiner*—Theodore A. Granger
*Attorney, Agent, or Firm*—Dunlap, Codding & McCarthy

[57] ABSTRACT

A guidance technique for producing a relief sculpture in which clay material is disposed between two parallel elevating tracks and is flattened by a cylindrical member supported by the tracks to form a design blank of a predetermined thickness. A design element template is used to direct the carving of a design element from the design blank. A plurality of design elements are successively formed accordingly. The thickness of each design element is determined by varying the number of flat track members that are stacked to form the parallel elevating tracks. The design elements are mounted on a base member to form a semi-finished intermediate, which is thereafter dried and baked to yield a finished relief sculpture.

12 Claims, 17 Drawing Figures

RELIEF SCULPTURE GUIDANCE METHOD

BACKGROUND OF THE INVENTION

1. Field of the Invention

The present invention relates to guidance methods for the production of art works, and more particularly, to a guidance method for the production of a relief sculpture.

2. Description of the Prior Art

In order to make the pleasure and relaxation of working with art media available to persons lacking skill or experience in artistic techniques, certain guidance methods have been developed which enable persons using them to produce a pre-designed work of professional appearance with relative ease. In the well-known "paint by numbers" system, for example, a canvas is provided with a pre-drawn outline, in which areas to be painted a certain color are designated by a certain number corresponding to that color. By painting designated areas of the outline with specified colors, a complete, multi-colored painting is produced. These guidance techniques offer particular value in the area of art education, since they permit a beginning artist to gain experience working with art media without exposure to the sense of failure which an inexperienced or unskilled artist may feel upon producing an unattractive or abortive work. Additionally, such guides permit persons of higher artistic skill, who are primarily seeking the relaxation of working with art media, the opportunity to produce attractive works without the creative strain which may be associated with producing an original work.

Guidance techniques permitting a novice artist to produce a pre-designed work of sculpture are known in the prior art. Generally, such prior art techniques have involved the use of a pre-designed stencil or template on a wedge of sculpture material pursuant to a design plan. The stencil is used to guide the carving of a section of sculpture of predetermined thickness from the wedge, with different templates being thereafter used to produce sections of the same thickness with different shapes. The sections thus formed are stacked adjacent to or atop one another in accordance with the design plan to form a complete three-dimensional sculpture.

The type of sculpture guidance technique described above has generally proved successful for sculpture media such as wood, from which sections may be accurately cut and stacked without substantial risk of deviation from the design plan. In more pliable sculpture media such as clay, on the other hand, prior art guidance techniques have not proven very satisfactory. With pliable media, the sculptured setions which are shaped individually by using the supplied templates are likely to be deformed or altered during the handling involved in assembling the sculpture. For example, with regard to sculpture elements built from two or more stacked sections, it will ordinarily be required that adhesive contact be formed between the sections, in order to prevent the sculpture from falling apart. Thereafter, it may be required, for aesthetic reasons, that the junction or junctions between the stacked sections be concealed, and that square corners at the boundaries of the sections be rounded out. The processes involved in accomplishing these steps, when executed by an inexperienced sculptor, necessarily entail risks that the sculpture, as finally formed, may feature undesirable departures from the design plan.

A more fundamental difficulty with the prior art guidance techniques described above rests in their procedural difference from the sculpture techniques used by the experienced, professional sculptor. While a person using a prior art guidance technique generally forms a sculpture by assembly of a number of sub-element wedges formed from sculpture medium, the professional sculptor generally produces a work by the entirely different process of removing sculpture material from a single block of sculpture medium. Consequently, persons following prior art guidance techniques are unable to fully experience and utilize classical sculpture methods. This may not only diminish the quality of their aesthetic experience, but may also reduce the art educational value of the guidance technique as well.

SUMMARY OF THE INVENTION

The present invention is a guidance method for producing a three-dimensional relief sculpture, pursuant to a design plan, which permits the user to form each design element of the sculpture individually, without the necessity for stacking of individual wedges. The technique of the present invention thus offers greater verisimilitude with classical sculpting methods, and greater accuracy in reproducing the design plan, even when it is followed by an inexperienced artist.

The method of the present invention comprises the steps of forming a clay material between two substantially parallel elevating tracks of variable preselected heights. A cylindrical member is rolled over the tracks to produce design blanks from the clay material. Design templates are used to direct the carving of design elements from the design blanks, with the design elements then being assembled on a flat base member, at locations prescribed by the design plan. In order to permit the formation of design elements of different heights, the elevating tracks comprise vertically stacked flat track members, with alteration of the height of the elevating tracks permitted by varying the number of track members in each elevating track. Once the design elements are assembled in accordance with the design plan, the clay material is then hardened to form a finished relief sculpture.

It is an object of the present invention to provide a guidance method for producing a relief sculpture which permits an inexperienced artist to produce a work of art of professional quality.

Another object of the present invention, while achieving the above stated object, is to provide a guidance method usable as a teaching aid to students of art who are being prepared to learn classical sculpture techniques.

A further object of the present invention, while achieving the above stated objects, is to provide a guidance method that forms the basis of an inexpensive yet easily achieved hobby for individuals having undeveloped artistic talent.

Other objects, advantages and features of the invention will be evident from the following detailed description when read in conjunction with the accompanying drawings and appended claims.

DESCRIPTION

Figure 1:
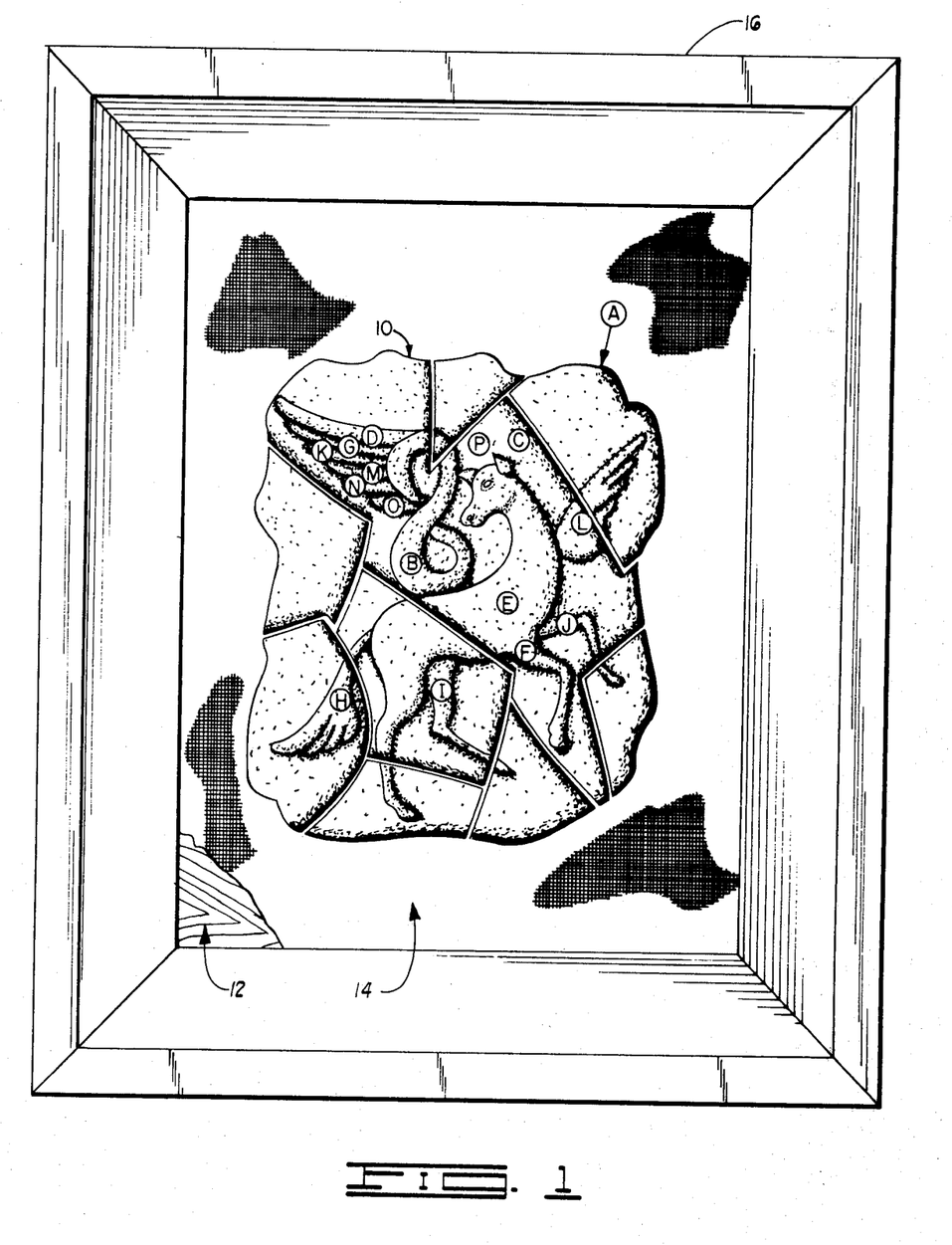
FIG. 1 is a front elevational view of an example relief sculpture artwork produced by the guidance method of the present invention.

Referring to the drawings in detail, the relief sculpture guidance method of the present invention will best be understood by beginning with particular reference to FIG. 1, which shows by way of example a finished artwork created by practicing the invention. FIG. 1 shows a finished artwork example 10 mounted on a board 12 (shown in cutaway) that has been covered with burlap quality, broad weave material 14 to form an attractive display background. The covered board 12 has been outlined with a frame 16 to complete the attractive arrangement provided for the artwork 10.

The example sculpture artwork 10 comprises a winged horse figure in a semi-abstract setting on a supporting background. Also, to give the artwork the appearance of antiquity, it has been cut into randomly shaped pieces to make it appear that it was reconstructed of fragments of the original. Initially, the fragmentation feature of the artwork 10 will be set aside for discussion below.

The artwork 10 is made up of a plurality of flat design elements or members joined to provide a three-dimensional, overall figure. These design elements vary in thickness according to a design plan discussed later herein. For the purpose of identifying the individual design elements that make up the artwork 10, these design elements will be assigned the following letter designations: a base member A, from the surface of which the thickness of the design elements is measured; a member B which abstractly resembles a numeral eight; a first ear member C; a first wing member D; a body member E; a first leg member F; a first wing member G; a tail member H; a second leg member I; a third leg member J; a first wing member K; a second wind member L; a first wing member M; a first wing member N; a first wing member O; and a second ear member P. These design elements are generally flat, planar members that, when constructed and assembled in the manner described hereinbelow, make up the relief details of the artwork 10.

The present invention is not limited to any specific shape, but rather, presents a method or reproducing a great variety of relief sculpture designs. The method lends itself especially well to relief sculpture designs which are comprised of a plurality of generally flat planar design elements of varying thicknesses that cooperate to form the sculpture proper. In the case of the cited example artwork 10, the designated design elements vary in thickness, as the overall design has been sculptured to vary in thickness from element to element to produce the three-dimensional figure, while at the same time the variance in thickness has been predetermined such that the thickness of each is a selected multiple of a predetermined dimension. In other words, the thickness of each design element is equal to an assigned thickness integer times a base number. The value of the base number will be discussed later hereinbelow; at this point it will be sufficient to assign a thickness integer as follows for each of the design elements that make up the artwork 10:

(a) Elements having a thickness integer of 4—A; B; C; D (b) Elements having a thickness integer of 3—E; F; G (c) Elements having a thickness integer of 2—H; I; J; K (d) Elements having a thickness integer of 1—L; M; N; O; P.

It will be clear that the flat design elements having a thickness integer of 4 are four times as thick as those having a thickness integer of 1; and in like manner, the other flat design elements that have thickness integers over 1 are multiples of the thickness of the elements having thickness integers equal to 1. Another way of considering this is that the flat design elements that make up the artwork 10 vary in plateau levels that differ in thickness as multiples of the plane that contains the top surfaces of the flat design elements of least thickness.

Figure 2:
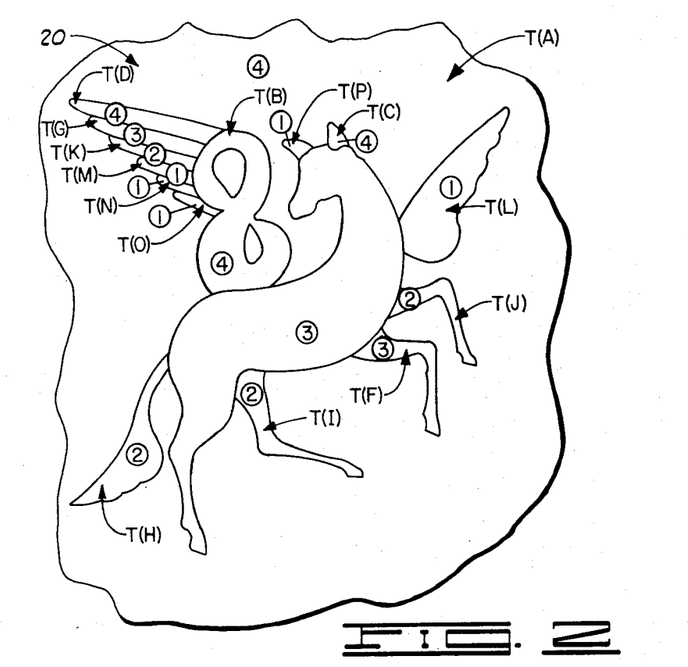
FIG. 2 shows a reference template used to form the artwork shown in FIG. 1.

Continuing with the present method, shown in FIG. 2 is a reference template 20 that is prepared from a thin sheet of cardboard or drawing paper. The material of the reference template 20 is preferably thin enough to cut readily with a thin knife, but of such composition that it may retain its shape when individual design element templates are cut therefrom. On the surface of the reference template 20 is drawn an outline which, when the artwork 10 is completed following the steps which will be discussed below, will conform to the outline of the base member A of the artwork 10. The drawing on the reference template 20 is completed by dividing it into the individual design element templates that will be used to form the individual flat design elements that make up the artwork 10 and which have been described above. After the drawing has been completed on the reference template 20, the individual design element templates are cut out using a thin knife or a tapered razor blade. The individual templates cut from the reference template 20 have been arbitrarily assigned a designation scheme using the letter "T" followed by the letter designate of the respective elements in parentheses. These individual design element templates are shown in FIGS. 3 through 7 where the templates are shown collected in groups having the same thickness integer. For ease of identification, shown on each design element template in a circle is the template's thickness integer.

Figures 3, 4:
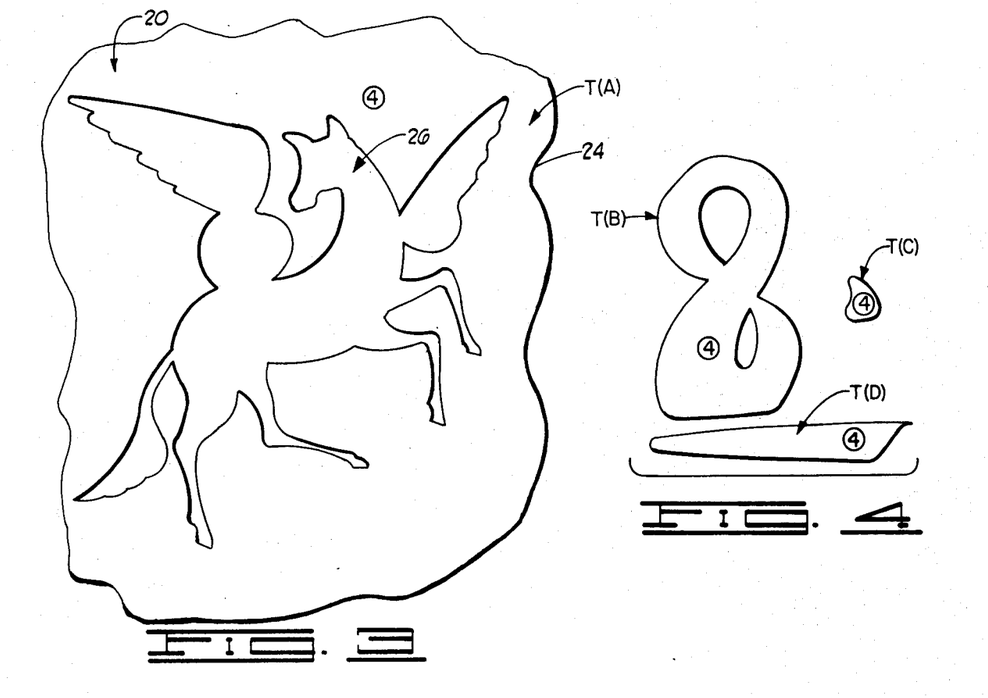
FIG. 3 shows the reference template having the individual design element templates removed therefrom.
FIG. 4 shows the templates that are used to make the design elements of the artwork 10 that have a thickness integer of 4.

FIG. 3 shows the reference template 20 with all of the individual design element templates removed therefrom, the remaining portion forming a template T(A). The template T(A) has a border 24 that conforms to the outer shape of the base member A of the artwork 10, and also, the template T(A) has a vacated or cutout portion 26 that serves as a placement stencil to outline the design element assembly in the steps which follow.

FIG. 4 shows the design element templates T(B), T(C) and T(D), corresponding respectively to the design elements B, C and D. Each of these design elements has a thickness integer of 4, as indicated by the circled number 4 on each of the templates of FIG. 4.

Figure 5:
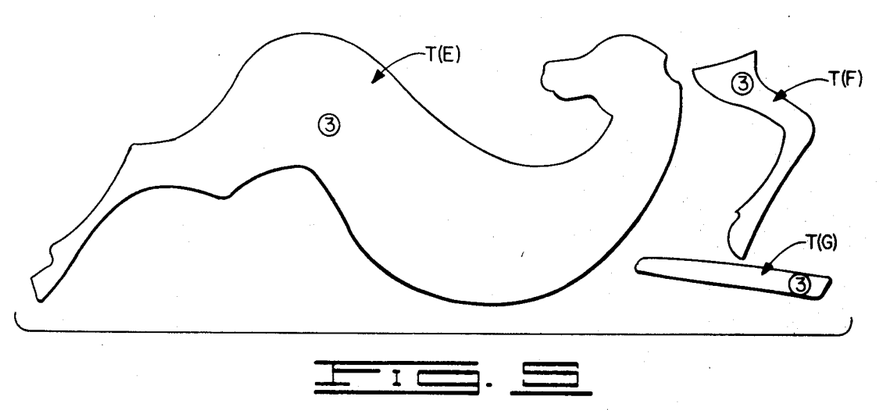
FIG. 5 shows the templates that are used to make the design elements of the artwork shown in FIG. 1 that have a thickness integer of 3.

FIG. 5 shows the design element templates T(E), T(F) and T(G), corresponding respectively to the design elements E, F and G. Each of these design elements has a thickness integer of 3, as indicated by the circled numeral 3 on each of the templates shown in FIG. 5.

Figure 6:
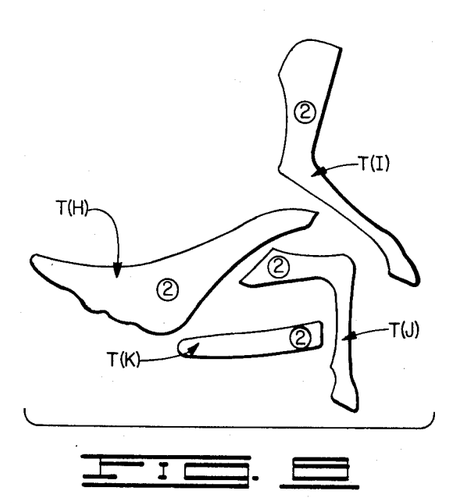
FIG. 6 shows the templates that are used to make the design elements of the artwork of FIG. 1 that have a thickness integer of 2.

FIG. 6 shows the design element templates T(H), T(I), T(J) and T(K), corresponding respectively to the design elements H, I, J and K. Each of these design elements has a thickness integer of 2, as indicated by the circled number 2 on each of the templates in FIG. 6.

Figure 7:
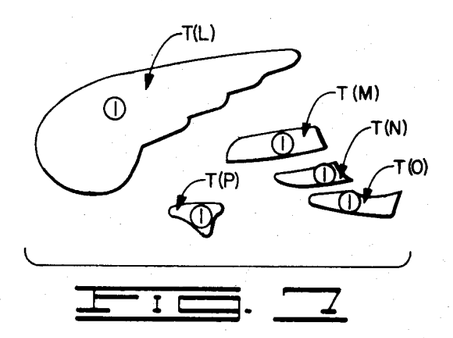
FIG. 7 shows the templates that are used to form the design elements of the artwork of FIG. 1 that have a thickness integer of 1.

FIG. 7 shows the design element templates T(L), T(M), T(N), T(O) and T(P), corresponding respectively to the design elements L, M, N, O and P. Each of these design elements has a thickness integer of 1, as indicated by the circled number 1 on each of the templates shown in FIG. 7.

Pursuant to the guidance method of the present invention, a flat base member A is initially formed from plastic or clay material. Thereafter, in accordance with a design plan, a plurality of flat design elements of varying thicknesses, also formed from the material, are mounted on the base member A. Thereafter, the assemblage of flat design elements on the base member is cured and fired to a hardened state to form a completed relief sculpture.

Having made the above described design element templates, the sculpturing is now undertaken using a plastic material, preferably a low fired clay that can be baked at a temperature of between approximately 150° F. to approximately 300° F. A clay that is of the type that is acceptable to practice the present invention may be purchased under the trademark Della Robbia, a clay product of Sculpture House, New York City, N.Y.

Figure 8:
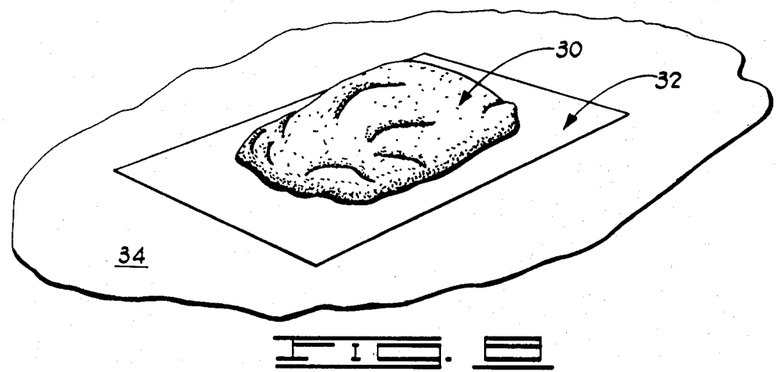
FIG. 8 shows a lump of clay positioned on a working surface preparatory to forming the clay into a base blank.
Figure 9:
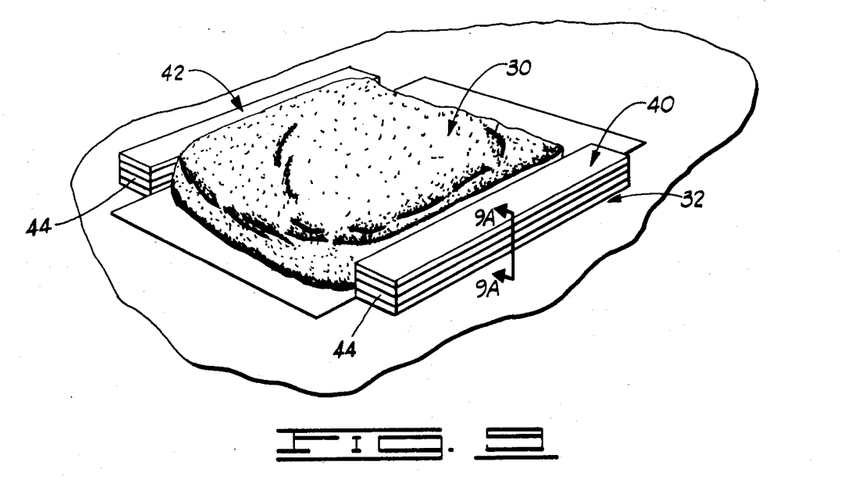
FIG. 9 depicts the lump of clay shown in FIG. 8 after the clay has been initially formed and a pair of parallel elevating tracks as been positioned on either side thereof.
Figure 9A:
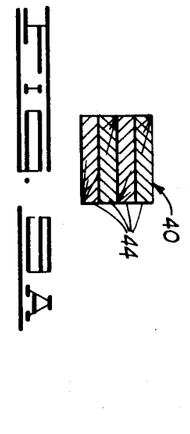
FIG. 9A shows a cross-sectional view of one of the elevating tracks shown in FIG. 9.

Referring now to FIG. 8, the base member A (see FIG. 1) is formed by disposing a lump of clay 30, in an amount sufficient to form the base member called for by the design plan, on a flat, porous working surface 32 that is in turn supported on a flat planar surface 34. For purposes of the present method, the working surface 32 may comprise a canvas or tablecloth. The clay lump 30 should be briskly patted with the palm of the artist's hand and formed into a roughly rectangular shape approximately one inch thick. On either side of the clay lump 30, a first elevating track 40 and a substantially parallel second elevating track 42 are positioned as shown in FIG. 9. The first and second elevating tracks 40 and 42 both are made up of an equal number of vertically stacked flat track members 44 as shown in the cross-sectional view of FIG. 9A. The track members 44 are of substantially equal thickness and are characterized by flat, substantially parallel, horizontal stacking surfaces. For purposes of practicing the present invention, the track members 44 may comprise conventional yardsticks, or any other boards of equal thickness that serve the purpose of the design plan. In the present illustration, the thickness of a conventional yardstick (approximately 3/16th of an inch) and the length of a yardstick are particularly suitable. The number of track members 44 in each elevating track will be varied according to the design plan in a manner to be described hereinafter in greater detail.

Figure 10:
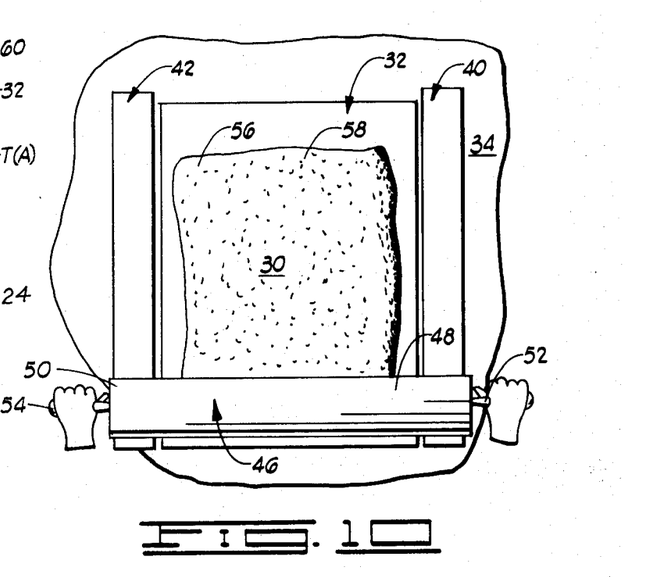
FIG. 10 depicts the positioning of a cylindrical member on the elevating tracks to form the clay of FIG. 9 into a base blank.

Having placed the stack of track members 44 on either side of the clay lump 30 to form the first and second elevating tracks 40 and 42, a cylindrical member 46, having a first end 48 and a second end 50, is placed on the elevating tracks 40 and 42 so that the first end 48 rests on the first elevating track 40 and the second end 50 rests on the second elevating track 42, as shown in FIG. 10. For purposes of the present illustration, the cylindrical member 46 may comprise a conventional rolling pin or a length of broom handle; in FIG. 10, the cylindrical member 46 is shown as a rolling pin having handle members 52 and 54 that can be gripped by the hands of the artist. Once disposed on the elevating tracks 40 and 42, the cylindrical member 46 is rolled on these tracks so as to flatten the clay lump 30 disposed beneath the rolling cylindrical member 46 into a base blank 56 having an upper flat surface 58 and a lower flat surface disposed on the working surface 32, the base blank having a thickness equal to the height of each of the elevating tracks 40 and 42.

Figure 11:
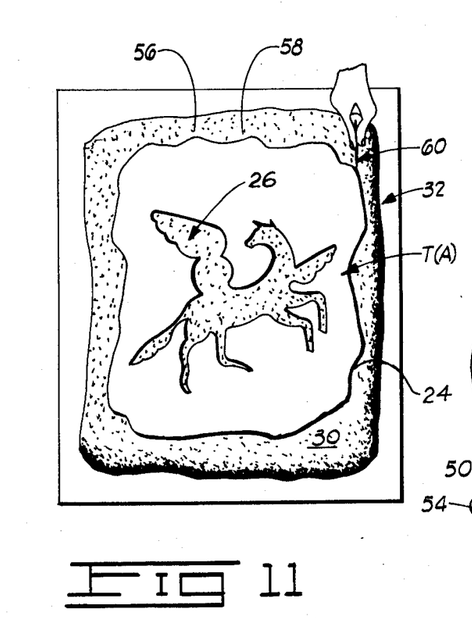
FIG. 11 depicts the placement of the reference template onto the base blank of FIG. 10 and the cutting of the base blank around the border of the template to form a base member.

The first and second elevating tracks 40 and 42 may be set aside, and with the clay base blank 56 yet in place, the base template T(A) is placed on the upper surface 58, as shown in FIG. 11. Using a sharp, pointed instrument 60, such as a toothpick, the artist is instructed by the design plan to cut through the clay around the outside 24 of the base template T(A) keeping the pointed instrument 60 generally perpendicular to the working surface 30. Once the template T(A) has been circumscribed by the use of the instrument 60, the excess clay from outside of the template is removed and reserved for the steps which will be described below. This step forms the base member A which has an upper surface 58 and a lower surface disposed on the working surface 32, the boundaries of the base member A being concurrent with the exterior contour 24 of the base template T(A), with edge surfaces generally perpendicular to the upper and lower surfaces. With the template T(A) yet on the surface 58, the artist is instructed to very carefully trace onto the base member A the outline of the figure presented by the cutout portion 26 of the template T(A). This outline, traced as a shallow groove onto the base member A with the instrument 60, provides guidance for the placement of the other flat design members as formed by the steps that follow.

After lightly tracing the outline of the figure represented by the cutout portion 26 onto the base member A, the base template T(A) is removed from the upper surface 58, and the base member A thus formed is set aside for later use.

It is again noted that the base member A has been arbitrarily assigned a thickness corresponding to a thickness integer of 4, as pointed out hereinabove, and as designated via the circled numeral 4 shown on the template in FIG. 3. The assigned thickness has been established for the base member A by stacking four track members 44 to form the first and second elevating tracks 40, 42, which served as rolling and guidance members for the cylindrical member 46 during the forming of the base member A. It is pointed out that the base member A has been arbitrarily designated by the first letter of the alphabet since it is the first member formed. This convention has been followed for each of the other members that comprise the artwork 10 so as to make the discussion presented herein more easy to follow; it will be recognized that the order of formation of the members that make up the artwork 10 is arbitrary and should not be considered limiting in the present invention.

Figure 12:
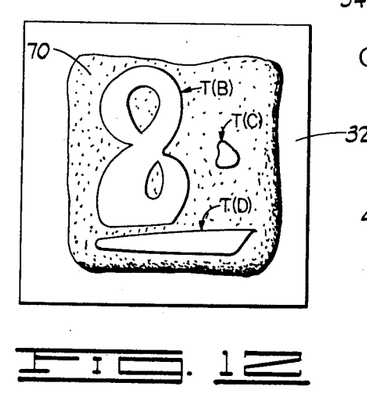
FIG. 12 shows another lump of clay that has been formed into a design blank, and the placement of design element templates thereon.

Next, another design blank is made, repeating the above described steps. That is, a lump of clay is rolled into a design blank 70 on the porous working surface 32 in the same manner described above in relation to FIGS. 8, 9 and 10, wherein is shown the clay lump 30 on the working surface 32. The design blank 70 formed from the clay lump is shown in FIG. 12. In this step, and in the ones to follow, the above mentioned convention will be followed in forming the elements in the order designated. Accordingly, the clay members B, C and D, all having thickness integers of 4, are formed by stacking four of the track members 44 to make up the first and second elevating tracks 40, 42 similar to the formation of the base blank member 56 discussed hereinbefore with reference to FIGS. 9, 9A and 10. The clay lump is positioned on the working surface 32, and the first and second elevating tracks 40, 42 are disposed on either side thereof. The clay lump is rolled into a design blank 70 of consistent thickness by supporting the cylindrical member 46 on the first and second elevating tracks 40 and 42 and thereafter rolling the cylindrical member over the clay lump. The clay lump used for this step may be new clay or it may contain the excess clay removed from the previous steps; that is, economy should be observed by using the excess clay removed in each step, reformed into an appropriately shaped starting lump, for subsequent steps.

Having thus formed the clay lump into a design blank having a thickness corresponding to a thickness integer of 4, (determined by the stacks of four track members 44 forming the first and second elevating tracks 40 and 42), the design element templates T(B), T(C) and T(D) are placed onto the design blank 70 as shown in FIG. 12. As discussed above with respect to the base blank member 56, the instrument 60 (depicted in FIG. 11) is once again used to carve clay from the design blank in order to form the design elements B, C and D; that is, the sharp instrument 60 is moved about the periphery of each of the design element templates T(B), T(C) and T(D) so as to form design elements from the design blank, with care to assure that the edges carved for each of the design elements are generally perpendicular to the working surface 32. The interior borders of the design element template T(B) are likewise cut. Again, the excess clay is removed from about the design blanks, and the design elements B, C and D thus formed are set aside for later use.

Figure 13:
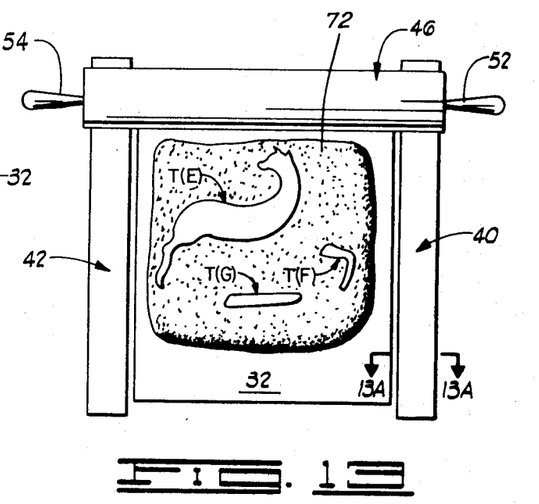
FIG. 13 shows yet another lump of clay that has been formed into a design blank together with another set of design element templates positioned thereon.
Figure 13A:
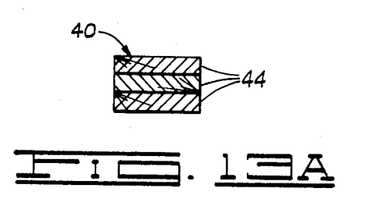
FIG. 13A is a cross-sectional view of one of the elevating tracks depicted in FIG. 13.

The next series of clay members to be carved will be the body member E, the first leg member F and the first wing member G. It was stated above that these clay members have been assigned a thickness integer of 3, which will translate into stacking 3 of the track members 44 to form each of the first and second elevating tracks 40 and 42. A clay lump is placed on the working surface 32 and rolled into a consistent thickness by using the cylindrical member 46 supported by the first and second elevating tracks 40, 42 as shown in FIG. 13. FIG. 13A, a cross-section of the first elevating track 40, shows this track as now being composed of a stack of three of the track members 44. Consequently, the thickness of the design blank 72 formed from the clay lump will be equal to the height of the first and second elevating tracks 40 and 42, which for the clay members under consideration has been established as three each of the track members 44.

Also shown in FIG. 13 are the design element templates T(E), T(G) and T(F) that have been placed onto the top surface of the rolled clay design blank 72. In the manner described above, the body member E, the first leg member F and the first wing member G are cut out of the design blank 72 using the sharp instrument 60 (depicted in FIG. 11). The excess clay is removed and these design elements are set aside for later use.

Figures 14, 15:
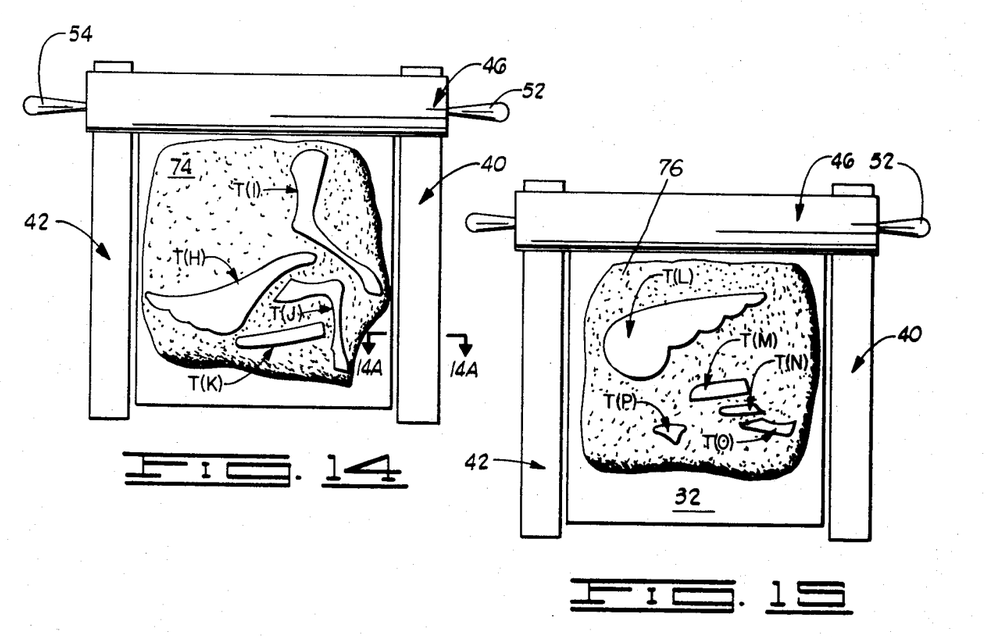
FIG. 14 depicts yet another lump of clay that has been formed into a design blank together with another group of design element templates positioned thereon.
FIG. 15 depicts another lump of clay that has been formed into a design blank together with another group of design element templates positioned thereon.
Figure 14A:
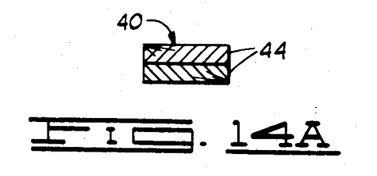
FIG. 14A is a cross-sectional view of one of the elevating tracks depicted in FIG. 14.

Continuing with the design plan, another lump of clay is placed on the working surface 32 and rolled into a design blank 74 of consistent thickness by using stacks of two each of the track members 44 in both the first and second elevating tracks 40 and 42. FIG. 14A, a cross-section of the first elevating track 40 in FIG. 14, shows the first elevating track 40 to be a stack of two of the track members 44, and this structure also applies to the second elevating track 42. As shown in FIG. 14, the design element templates T(H), T(I), T(J), and T(K) are disposed on the upper surface of the design blank 74 and are circumscribed by use of the sharp instrument 60 illustrated in FIG. 11. The design elements thus formed, namely the tail member H, the second leg member I, the third leg member J and the first leg member K, all have thicknesses corresponding to a thickness integer of 2. As before, the excess clay is removed and the clay design elements are set aside for later use.

A final lump of clay, in accordance with the design plan, is placed on the working surface 32 and rolled to a consistent thickness using a single track member 44 to form each of the first and second elevating tracks 40 and 42, as depicted in FIG. 15. Once the clay lump has been formed into a design blank 76 having a thickness equal to the thickness of one of the track members 44, the design element templates T(L), T(M), T(N), T(O) and T(P) are placed on the upper surface of the clay design blank 76, and each of these templates is circumscribed in the manner above described using the sharp instrument 60. This forms the second wing member L, the first wing member M, the first wing member N, the first wing member O and the second ear member P. Again, the excess clay is removed, and the design elements L, M, N, O and P are set aside for later use.

Having progressed through each of the steps discussed above, the artist has now formed the clay design elements A through P. It will be remembered that these clay design elements, which are sub-elements of the overall assemblage that forms the artwork 10, have been made to have various thicknesses characterized by their assigned thickness integers. If the thickness of each of the track members 44 is assigned a value of unity, then the thickness of the planar clay design elements formed thus far are as follows: The clay members A through D have a thickness of 4; the clay members E through G has a thickness of 3; the clay members H through K have a thickness of 2; and the clay members L through P have a thickness of 1. At this point, the clay design elements may be assembled to form the artwork 10.

The surface of each of the design elements that was disposed in contact with the porous working surface 32 during formation of the design elements will be referred to as the mounting surface of each respective design element, while the upper surface of design element parallel to the mounting surface will be referred to as the display surface. It is the mounting surface that will be glued to the base member A in the assemblage of the formed design elements to create the artwork 10. These mounting surfaces are coated with slip, a substance formed as follows: A piece of clay about the size of a hen egg is placed in a bowl, and a small amount of water is added. Working the clay with the fingers, a small quantity of water is added gradually until the clay is the consistency of soft, melted ice cream. Using a small watercolor brush, the mounting surface of each of the clay design elements B through P is coated with the slip. The upper surface of the base member A, which was designated 58 in FIG. 11, will be referred to as the support surface of the base member A. It will be remembered that the support surface 58 contains the light impression made by the cutout portion 26 in the reference template T(A). Consulting the reference template T(A) (it is suggested that the reference template T(A) be placed on a flat surface and that the other templates cut therefrom be replaced for reference purposes), the clay design elements B, C and D are positioned in their proper places on the base member A. Some may prefer to also coat the appropriate portions of the base member A prior to placement of the design elements thereon. Once these clay design elements are in position, gentle downward pressure should be exerted on the design elements to form a bond with the base member A. It is suggested that the base member A be placed on a planar surface, such as the support surface 34, during the assemblage of the design elements thereto.

In like manner, the mounting surfaces of the other design elements E through P are coated with slip, using the small watercolor brush, and these design elements are also positioned appropriately onto the base member A, as dictated by the reference template T(A) and the outline impressed in the support surface 58 of the base member A. It is suggested, although not critical, that the next design elements to be glued to the base member be those having a thickness integer of 3, which are the design elements E through G; that the next group of design elements added thereafter be those having a thickness integer of 2, which are the design elements H through K; and that the final design elements added be those having a thickness integer of 1, which are the design elements L through P. As each of these design elements is appropriately positioned onto the base member A, the application of gentle downward pressure on the design elements will assure a strong bond between the mounting and support surfaces.

Having placed all of the flat design elements B through P in the appropriate positions on the base member A, any fine detail which may be required by the design plan may be executed. For example, facial features of human or animal characters to be depicted by the relief sculpture may be detailed by hand at this point. In the present illustration, referring to the artwork 10, it is suggested that the tip of a pencil be used to make nostril indentations for the horse. Using the above mentioned water brush moistened with water, the lines around the nostril should be softened and smoothed. In the same way, the lines between contiguous clay portions should be softened and smoothed to provide an appearance of continuity.

To make the eye for the figure, it is suggested that a small piece of clay be formed as a slightly flattened ellipse. The eyelids may thereafter be formed from small pieces of clay rolled into appropriately sized curved rods which may then be positioned on opposite sides of the elliptically shaped eye piece. After applying slip to one side of this assemblage, the completed eye and eyelid combination is positioned in its appropriate place on the body member E.

If an antique or "shattered" effect is desired for the finished relief sculpture, the assembled artwork 10 may be cut into segmented pieces as shown in FIG. 1 by using a sharp, thin-bladed knife to cut completely through the base member A and the assemblage of design elements. It is best to cut from the inside of the figure to the outside, moving the knife very slowly. Also, it is recommended that the outer border or edge of the base member A be braced with the fingers as th base member is cut.

The artwork 10, at this stage, is in a semifinished intermediate form and must be cured in order to become a finished relief sculpture. This is performed by placing the artwork 10, appropriately supported on a planar surface, in a draft-free area such as a closet. When the artwork 10 form is completely dried, it is baked in an oven at a baking temperature appropriate to the clay used to form the artwork 10. For the type of clay suggested herein, this temperature is normally between approximately 150° F. and 300° F. After the artwork 10 has completely hardened, it is removed from the oven and allowed to cool to ambient temperature. Thereafter, the finished relief sculpture may be painted, mounted and framed via conventional methods.

It will be noted that the use of variable height elevation tracks in the present method permits each design element to be formed form an integral block of sculpture material, regardless of the thickness of the design element called for by the design plan. This feature represents an improvement over prior art guidance techniques inasmuch as it reduces chances for assembly errors and increases the similarity of the guidance method to classical sculpture technique. The method of the invention thus offers a unique opportunity for an inexperienced individual to produce relief sculptures of professional appearance while experiencing the relaxation and satisfaction of working with artistic media, yet without substantial departure from the carving technique of the classical sculptor.

It is clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the following claims.

What is claimed is:

1. A method for producing a relief sculpture artwork from clay material, the method comprising the steps of:
    (a) disposing the clay material, in an amount sufficient to form a first design blank, on a working surface between two substantially parallel first and second elevating tracks, each of the elevating tracks having a height equal to the desired thickness of the first design blank;
    (b) locating a rigid cylindrical member, having a first end and a second end, so that the first end rests on the first elevating track and so that the second end rests on the second elevating track;
    (c) rolling the cylindrical member along the length of the elevating tracks so that the clay material disposed between the elevating tracks is molded into the first design blank having a flat display surface and a substantially parallel flat mounting surface, the first design blank being molded to a height above the working surface equal to the height of the elevating tracks;
    (d) contacting the display surface of the first design blank with a first design element template;
    (e) removing clay material from around the borders of the design template to define a first design element having a flat, planer display surface substantially concurrent with the first design element template outline;
    (f) removing the first design element template from the display surface of the first design element;
    (g) securing the mounting surface of the first design element to a substantially flat base member;
    (h) forming a second design element by repeating steps (a) through (f), using a second design element template, the second design element having a flat display surface and a substantially parallel flat mounting surface, the second design element an altered height from the first design element which is accomplished by altering the height of the elevating tracks used to form the first design element so that the second design element has a different thickness than the first design element; and
    (i) securing the mounting surface of the second design element to the substantially flat base member.

2. The method of claim 1 in which the step of forming the first and second design blanks is further defined by characterizing each elevating track as comprising a plurality of vertically stacked elongate track members of equal thickness, with each track member having flat, substantially parallel stacking surfaces, and by characterizing the alteration of the height of the elevating tracks as being accomplished by changing the number of track members forming each elevating track.

3. The method of claim 2 in which the design element template used to form the boundaries of the second design element is shaped differently than the design element template used to designate the boundaries of the first design element.

4. The method of claim 3 in which the base member is formed from the same type of clay material used to form the first and second design elements and the base member is formed by the steps of:
    disposing the clay material, in an amount sufficient to form the base support member, on a working surface between two substantially parallel first and second elevating tracks, each of the elevating tracks having a height equal to the desired thickness of the base support member;
    positioning a rigid cylindrical member having a first end and a second end on the first and second elevating tracks so that the first elevating track and the second end rests on the second elevating track; and
    rolling the cylindrical member along the length of the elevating tracks so that the clay material disposed between the elevating tracks is molded to a height above the working surface equal to the height of the elevating tracks.

5. The method of claim 4 in which a reference template is used to designate a visible outline on the base member showing the location at which each design element is secured to the base member.

6. The method of claim 5 in which the design elements are secured to the base member by slip applied at the area of contact between the mounting surface of each design element and the support surface of the base member.

7. The method of claim 6 in which hardening of the relief sculptured artwork is accomplished by drying the assemblage of the base member and the secured design elements, and thereafter baking the dried relief sculptured artwork at the recommended firing temperature of the clay material.

8. A relief sculpture guidance method for producing a relief sculpture artwork of a low fired clay material, the method comprising the steps of:
    (1) preparing a reference template designating a plurality of areas, each of which corresponds to a flat design element, the flat design elements to have different thicknesses according to a predetermined design plan incorporating said flat design elements into the three-dimensional artwork;
    (2) cutting said reference template along the boundaries about each area to form a plurality of member templates, each such design element template corresponding to one each of the flat design members;
    (3) removing said design element templates from the reference template;
    (4) forming a quantity of the clay material into a flate base blank of a predetermined thickness by the steps of:
        (4a) disposing the quantity of clay material on a planer working surface between two substantially parallel first and second elevating tracks, each of the elevating tracks having a height equal to the desired thickness of the base member; and
        (4b) moving a cylindrical member as it is rollingly supported by the first and second elevating tracks in forming contact with the clay material on the working surface so that the clay material is molded into a base blank having a substantially uniform thickness equal to the height of the elevating tracks;
    (5) placing the reference template onto the surface of the base blank;
    (6) cutting the base blank by guiding a cutting instrument around the borders of the reference template positioned on the base blank, and removing excess clay material from the cut base blank to form a base member having a flat support surface;
    (7) removing the base member from the working surface;
    (8) altering the heights of the first and second elevating tracks to correspond to the thickness of a selected one of the flat design elements;

(9) forming a quantity of the clay material into a first design blank by the steps of:
  (9a) disposing a quantity of the clay material on the working surface between the first and second elevating tracks; and
  (9b) moving the cylindrical member as it is rollingly supported by the first and second elevating tracks in forming contact with the clay material on the working surface so that the clay material is molded into the first design blank having a substantially uniform thickness equal to the height of the elevating tracks;
(10) placing the design element template corresponding to the selected one of the flat design elements onto the surface of the first design blank;
(11) cutting the first design blank by guiding a cutting instrument around the border of the design element template positioned on the first design blank, and removing excess clay material from the cut first design blank to form a first design element having a flat mounting surface;
(12) removing the design element template from the first design element;
(13) removing the first design element formed from the working surface;
(14) forming each of the other design elements by repeating steps (8) through (13) for each said design element at least a portion of the other design elements being formed of a thickness different than the thickness of the first design element;
(15) securing each of the design elements to the base member in an assemblage conforming the contours of the reference template to form the relief sculpture artwork; and
(16) curing the relief sculpture artwork formed from the assemblage of the base member and the design elements.

9. The method of claim 8 wherein each elevating track is comprised of vertically stacked elongate track members of equal thickness, with each track member having flat, substantially parallel stacking surfaces, and the alteration of the height of the elevating tracks is accomplished by changing the number of track members forming each elevating track.

10. The method of claim 9 in which the reference template is used to designate a visible outline on the base member to show the location for placement of each flat design element as it is secured to the base member.

11. The method of claim 10 in which the flat design elements are secured to the base member by slip applied at the area of contact between the mounting surface of each design element and the support surface of the base member.

12. The method of claim 11 in which curing of the relief sculptured artwork is accomplished by drying the relief sculptured artwork formed by the assemblage of base member and secured design elements, and thereafter baking the dried relief sculptured artowrk at the firing temperature of the clay material.

* * * * *

UNITED STATES PATENT AND TRADEMARK OFFICE
CERTIFICATE OF CORRECTION

PATENT NO. : 4,284,407
DATED : August 18, 1981
INVENTOR(S) : Ben H. Hofstetter

It is certified that error appears in the above—identified patent and that said Letters Patent is hereby corrected as shown below:

Column 1, line 53, the word "setions" should be --sections--.

Column 3, line 20, the word "as" should be --has--.

Column 6, line 52, the numeral "30" should be --32--.

Column 10, line 47, the word "form" should be --from--.

Column 12, line 41, the word "flate" should be --flat--.

Column 14, line 29, the word "artowrk" should be --artwork--.

Signed and Sealed this

Nineteenth Day of January 1982

[SEAL]

Attest:

GERALD J. MOSSINGHOFF

Attesting Officer

Commissioner of Patents and Trademarks